United States Patent [19]
Kühbauch

[11] Patent Number: 4,776,056
[45] Date of Patent: Oct. 11, 1988

[54] WINDSHIELD WIPER DEVICE WITH COMPENSATING HINGE

[75] Inventor: Gerd Kühbauch, Bühlertal, Fed. Rep. of Germany

[73] Assignee: Robert Bosch GmbH, Stuttgart, Fed. Rep. of Germany

[21] Appl. No.: 5,259

[22] Filed: Jan. 20, 1987

[30] Foreign Application Priority Data

Apr. 26, 1986 [DE] Fed. Rep. of Germany ....... 3614166

[51] Int. Cl.$^4$ ............................................. B60S 1/26
[52] U.S. Cl. ............................... 15/250.21; 15/250.23
[58] Field of Search ............ 15/250.21, 250.23, 250.3; 74/23, 25

[56] References Cited

U.S. PATENT DOCUMENTS 4,625,359 12/1986 Walter et al. ............... 15/250.21
4,646,580 3/1987 Dunn ........................................ 74/44
4,648,148 3/1987 Walter et al. ................... 15/250.21

FOREIGN PATENT DOCUMENTS 3409256 9/1985 Fed. Rep. of Germany ... 15/250.21
3426607 1/1986 Fed. Rep. of Germany ... 15/250.13

Primary Examiner—Harvey C. Hornsby
Assistant Examiner—Stephen F. Gerrity
Attorney, Agent, or Firm—Michael J. Striker

[57] ABSTRACT

A windshield wiper system for motor vehicles includes a wiper blade supported on an oscillating and reciprocating wiper arm driven by a plunger guided in a guide during its reciprocal movement and provided with a compensating hinge and supported by two parallel slides guided on two elongated guide rails parallel to the axis of elongation of the plunger. In order to compensate for alignment errors each slide is movable relative to the plunger about the axis of the compensating hinge.

12 Claims, 2 Drawing Sheets

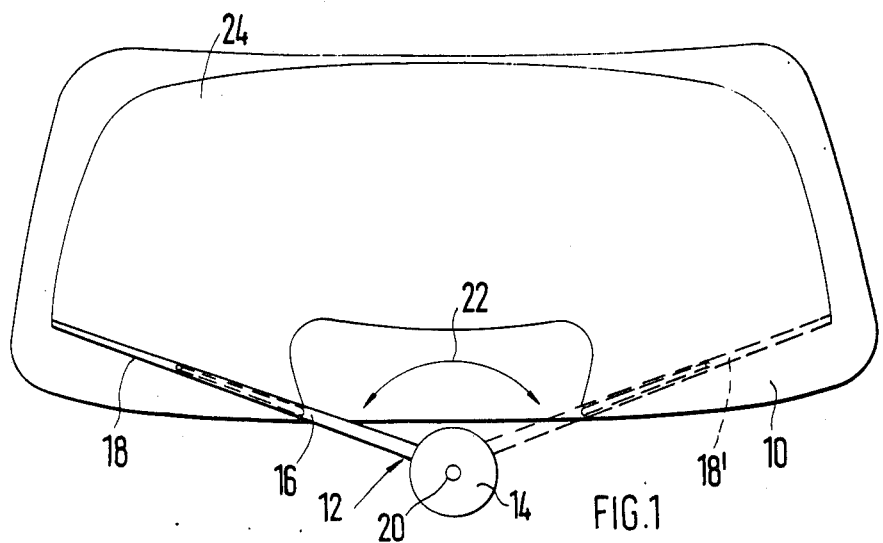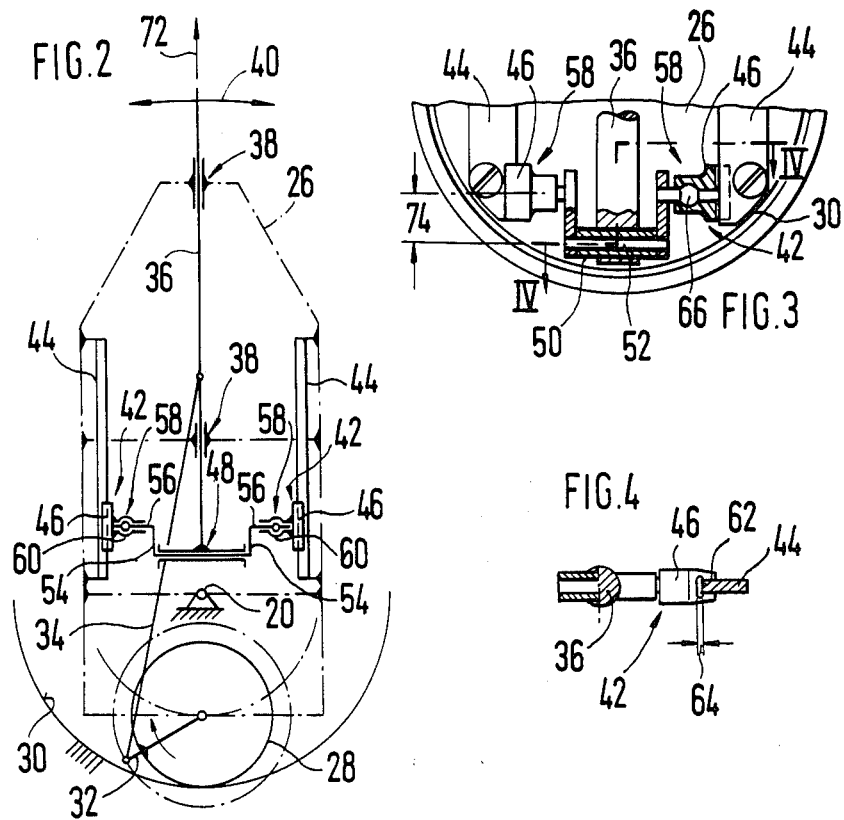

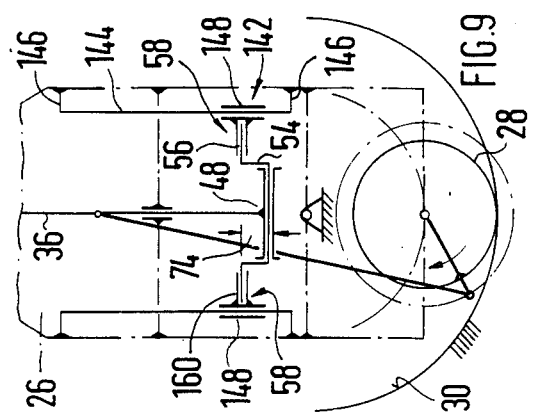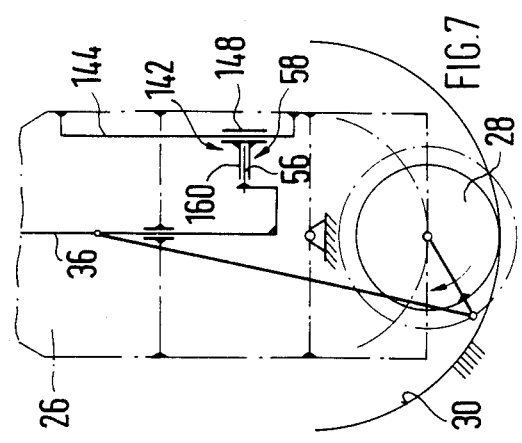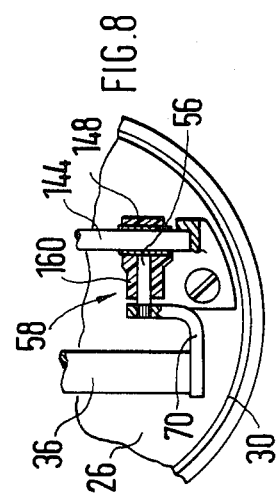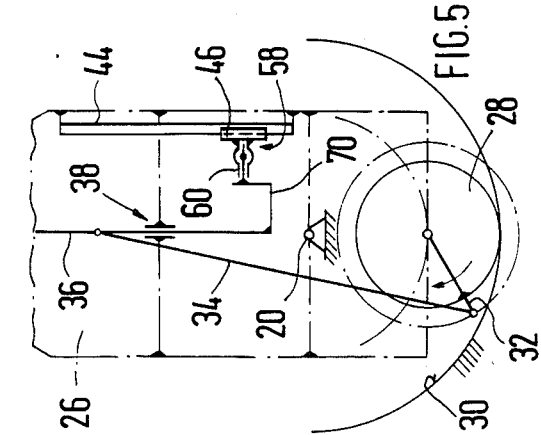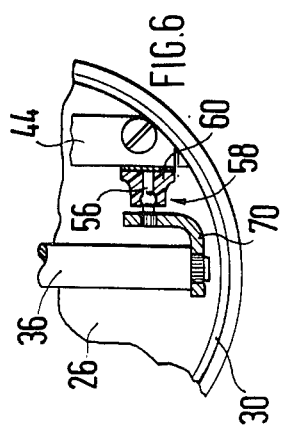

WINDSHIELD WIPER DEVICE WITH COMPENSATING HINGE

BACKGROUND OF THE INVENTION

The present invention relates to a windshield wiper device for motor vehicles of the the type that comprises an oscillating wiper blade supported on a wiper arm connected to a drive for oscillating the wiper arm with the wiper blade.

Wiper systems of the foregoing type are known. In a windshield wiper system disclosed, for example in DE-PS No. 34 09256, a plunger is arranged in a recess of the carriage of the slide guide with a play in order to compensate for manufacture tolerances so that the carriage can be adjusted on the guide within predetermined limits relative to the axis of movement of the plunger. This known arrangement, however requires high precision during the manufacture because the play should be available only in the direction of the oscillation axis. The plunger, however must be mounted without any play in the recess of the carriage in the direction transversal to the oscillation axis and transversal to the axis of the plunger movement. Also, the movement of the plunger in the recess of the carriage can lead to undesired rattle sounds.

SUMMARY OF THE INVENTION

It is an object of the present invention to provide an improved windshield wiper system for motor vehicles.

It is another object of this invention to provide a wiper device in which manufacture tolerances and alignment errors in the regions of the plunger guide means and the slide guide would be compensated for in a very simple and inexpensive fashion.

These and other objects of the present invention are attained by a wiper device for windshields of motor vehicles, comprising a wiper blade driven for an oscillating movement against a windshield to be wiped; an oscillating wiper arm connected to said wiper blade; a driven oscillating transmission member cooperating with said wiper arm; drive means for displacing said wiper arm during an oscillating movement thereof in a direction transversal to said oscillating movement, said drive means including a movable elongated plunger connected to said wiper arm and having a round cross-section, a guide for guiding said plunger in the direction of elongation thereof; slide guide means supporting said plunger and arranged near an axis of elongation of said plunger and connected with said transmission member, said slide guide means extending parallel to an axis of elongation of said plunger and including at least one guide rail rigidly connected to said transmission member and at least one sliding piece slidable on said rail and connected to said plunger, and a compensating hinge operatively interconnected between said sliding piece and said plunger and having an axis, said sliding piece being movable about the axis of said compensating hinge which is arranged transversely to an axis of oscillation of said transmission member and transversely to a direction of movement of said plunger. Due to the present invention manufacture allowances in the region of guiding the reciprocating plunger would be eliminated, which is particularly important in cases of plungers with large strokes.

The compensating hinge may include a first half connected to said plunger and a second half connected to said sliding piece.

The first half of the hinge may be formed by a bearing sleeve and said second half is formed by a bearing pin received in said bearing sleeve.

The slide guide means may include a single guide rail parallel to the axis of elongation of said plunger and a single sliding piece which is guided on said guide rail.

The guide rail may be a strip rectangular in cross section, said sliding piece having a groove which embraces said strip at least partially at three sides thereof.

The groove has a base, said base may be spaced from said strip, said first and second half of said compensating hinge being secured against displacement relative to each other in the direction of the axis of said hinge.

The guide rail may be a rod round in cross-section and be connected to said transmission member via a spacer, said sliding piece being a cylindrical sleeve surrounding said rod.

The slide guide means may include two guide rails positioned opposite each other relative to the axis of elongation of said plunger and two slide pieces each being slidable on a respective guide rail and operatively connected to said plunger, and further including two additional compensating hinges each interconnected between said compensating hinge and a respective sliding piece, each additional compensating hinge having an axis parallel to the axis of said compensating hinge and spaced from said axis at a distance.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 1 is a front view of the windshield of a vehicle with a wiper device;

FIG. 2 is a schematic view of the drive device which effects the displacement of the wiper arm directed transversely to the oscillation movement thereof, according to a first embodiment of the invention;

FIG. 3 is a partial sectional view of the device of FIG. 2;

FIG. 4 is a sectional view of the plunger with a slide guide, taken along line IV—IV of FIG. 3;

FIG. 5 is a schematic view of the drive device according to a second embodiment;

FIG. 6 is a partial sectional view of the drive of FIG. 6;

FIG. 7 is a schematic view of yet another embodiment of the drive device;

FIG. 8 is a partial sectional view of the drive of FIG. 7; and

FIG. 9 is a schematic view of a still further embodiment of the drive according to the invention.

DETAILED DESCRIPTION OF THE PREFERRED EMBODIMENTS

Referring now to the drawings in detail, reference numeral 10 in FIG. 1 designates a windshield on which a wiper device 12 is arranged. The wiper device 12 includes a translatory drive 14 which drives a wiper arm 16 to oscillate the latter. The wiper arm 16 oscillates together with a wiper blade 18 secured to the free end of the wiper arm between two end positions as shown by a double arrow 22 about a pivot axis 20 which belongs to the translatory drive 14. The first end position of the wiper blade 18 is shown in FIG. 1 with solid line whereas the second end position is shown with the dashed line and is indicated by reference numeral 18'.

The wiper blade 18 which lies against the windshield to be wiped during the oscillating motion 22 also performs a displacement movement which is radial relative to the oscillation axis 20 so that the field 24 to be covered with the wiper blade has the shape deviated from the circular segment. So-operated wiper systems are normally employed when a single windshield wiper must cover the largest possible area of the windshield. Particularly those areas of the windshield must be covered, which are remote from the oscillation axis. The device that has been described up till now is a conventional device in which the present invention described herein below can be employed.

FIG. 2 illustrates the drive device which serves to impart to the wiper 16, 18, in addition to the oscillation movement, a sliding motion which extends transversely to the oscillation movement. This drive device includes a transmission member 26 shown by dash-dotted line and which is rigidly supported in a frame or a housing by an oscillation shaft defined by the oscillation axis 20. A gear 28 is rotationally supported on the transmission member 26. The axis of rotation of gear 28 extends parallel to the oscillation axis 20. The gear 28 meshes with a stationary toothed segment 30 which has an internal toothing. Gear 28 is rigidly connected with a crank 32 on the free end of which the end of a driving rod 34 is pivoted. The other end of this driving rod is pivotally connected to a rod-like plunger 36 which is guided in two guide sleeves 38 aligned with each other and provided in the transmission member 26. When the transmission member 26 is set, by a non-shown but conventional oscillation motion drive, into a swinging motion in accordance with double arrow 40 the gear 28 would roll on the toothing of the toothed segment 30 so that the crank 32 rigidly connected with gear 28 rotates. Thereby the plunger 36 is set to a reciprocal movement. In this manner, the wiper arm 16 connected with the plunger or rod 36 as well as the wiper blade 18 connected to the wiper arm 16 move in the direction transversal to the oscillation motion 22. Due to friction between the wiper blade 18 and the windshield 10 and the distance between the pane or the wiper rubber lying on the pane and the central axis of the plunger or rod 36, torque is exerted on this plunger, which causes the plunger, which is round in cross-section, to turn about its axis of elongation. Such rotation movement is however undesired because it negatively affects the quality of wiping. It should be provided that the rotation of the plunger or rod 36 about the axis of elongation thereof be prevented. For this purpose, the drive device included a slide guide 42 connected to the transmission member 26 and extended parallel to the axis of elongation of plunger 36. Slide guide 42 includes two parallel guide rails 44 rigidly secured to the transmission member 26. A sliding piece 46 is guided in each guide rail 44. Both sliding pieces 46 are connected to the plunger 36.

As further shown in FIG. 2 the end of the plunger or rod 36, which faces away from the wiper blade 18, carries a transversal hinge 48 which has a bearing sleeve 50 (FIG. 3) and a bearing pin 52 movable in the sleeve 50. Rocking arms 54 are connected to both ends of the bearing pin 52 and each rocking arm or rocker 54 carries a bearing pin 56 which belongs to a compensating hinge 58. Each compensating hinge as, in addition to the bearing pin 56, a bearing sleeve 60 connected to the respective sliding piece 46. Each bearing sleeve 60 is movable on the assigned bearing pin 56. The arrangement of the bearing pins 56 is such a that the axes of both compensating hinges 58 are in alignment with each other. As further shown in FIG. 2 the axis of hinge 48 is spaced from the common axis which extends through the compensating hinges 58. The axes of the compensating hinges 58 are spaced by distance 74 from the axis of hinge 48 as can be seen from FIG. 3.

FIGS. 3 and 4 illustrate in detail the arrangements of the transversal hinge 48 and two compensating hinges 58. As seen in FIG. 4 the guide rail 44 is formed as a strip having a rectangular cross-section. This strip is surrounded at three sides thereof by a slide groove 62 provided in the respective sliding piece 46. This arrangement is formed so that the base of groove 62 is spaced from the strip 44 by distance 64. As further shown in FIG. 3, one-half 46, e.g. the sliding piece, of each compensating hinge 48 is locked against displacement on the other half 56, e.g. the bearing pin, of this hinge. This is obtained by a ball-shaped enlargement 66 provided on the bearing pin whereby the sleeve-shaped portion of elastic material of the sliding piece 46 is locked on the ball-shaped enlargement 66 under a predetermined expansion of the sleeve bore.

When in operation of the wiper device the plunger 36 is moved in the direction of arrow 72 and opposite to the direction of arrow 72 the sliding pieces 42 slide along the strip-like guide rails 44 whereby the rotation of the plunger 36 about the axis of elongation thereof is prevented. The alignment errors between the guide sleeves 38 or plunger 36 and the guide rails 44 are compensated for by the transversal hinge 48 and compensating hinges 58. Alignment errors in the planes of the guide rails or strips 44 are compensated for by the distance 64 (FIG. 4) between the base of the groove 62 in the respective sliding piece 46 and the guide rail 44.

In the embodiment shown in FIGS. 5 and 6, a single one-side support is provided for receiving the torque acting on the plunger 36. Alignment errors between the plunger 36 and the guide strips 44 are eliminated in the compensating hinge 58. Thereby it is obtained that the plunger 36 can turn about its axis of rotation only by a small insignificant amount. Such a minimal rotation does not, however, affects the quality of wiping. It is clear that without the rotation support arranged adjacent the plunger 36 the wiper blade 18 movable on the windshield to be cleaned would, due to the torque on the plunger, turn by about 90 degrees and thereby would make the wiper device inoperative.

The embodiment shown in FIGS. 7 and 8 operate in the manner similar to that of the embodiments of FIGS. 2-4 and 5, 6. In the embodiment shown in FIGS. 7 and 8, the compensation for alignment errors is obtained in that a predetermined amount of the compensating movement between the bearing pin 56 and a bearing sleeve 160 can be achieved. The detailed description of the embodiment of FIGS. 7 and 8 will be provided herein after the description of the embodiment shown in FIG. 9.

The embodiment depicted in FIG. 9 is distinguished from the embodiment in accordance with FIGS. 2 to 4 in that the guide rails are formed as rods 144 which are round in cross-section. Rods 144 are connected with the transmission member 26 via spacers 146. The sliding pieces in this embodiment are formed as cylindrical sleeves 148 surrounding the rods 144. The arrangement and construction of the transversal hinge 48 completely correspond to that described in connection with FIGS. 2-4. The locking of the sliding pieces on the bearing pieces 56 of the rockers or swinging arms 54 is not required in this case because the cylindrical sleeves 148 are fixed in the direction of the axes of the bearing pins 56. The compensating hinges 58 are formed so that the bearing pins 56 are inserted in the bearing sleeves 160 rigidly connected with the cylindrical sleeves 148. The compensation for errors in the arrangement of the guide rods 144 is carried out between the bearing pins 56 and bearing sleeves 160.

The embodiments of FIGS. 5, 6 and 7, 8 are distinguished from the above described embodiments in that a single guide rail is provided for the sliding piece as mentioned above. The design of the guiding rail in FIGS. 5 and 6 and its connection to the transmission member 26 fully coincide with those disclosed for the embodiment of FIGS. 2-4. The guide strip 44 rigidly secured to the transmission member 26 guides the sliding piece 46 which is locked on the bearing pin 56 by means of the bearing sleeve 60. The bearing pin 56, in contrast to the embodiment of FIGS. 2-4, is rigidly connected to a support element 70 which is in turn connected to the plunger 36.

In the embodiment according to FIGS. 7 and 8, the arrangement of FIGS. 5 and 6 is combined with the guide arrangement 144, 146, 148 of FIG. 9. Also, here a single guide rail, parallel to the axis of elongation of the plunger 36, is provided, which guide rail is formed as the rod 144 having a round cross-section. The cylindrical sleeve 148 is guided on the rod 144. The bearing sleeve 160 is rigidly connected to the bearing sleeve 148. The bearing sleeve 16 receives the bearing pin 56 which is situated on the angular support element 70 which is in turn rigidly connected to the plunger 36. This arrangement is shown in detail in FIG. 8.

In all the embodiments of the present invention, the sliding piece 46 or 148 is movable about the axis of the compensating hinge 58 whereby this axis is mounted transversely to the oscillation axis 20 and also transversely to the direction of movement of plunger 36 (arrow 73 in FIG. 2). A further common characteristic for all the embodiments resides in that one-half of the compensating hinge 58, namely the bearing pin 56, is rigidly connected to the plunger 36 whereas its other half, namely the bearing sleeve 60 or 160, is rigidly connected to the sliding piece 46 or 148, respectively.

It will be understood that each of the elements described above, or two or more together, may also find a useful application in other types of wiper systems differing from the types described above.

While the invention has been illustrated and described as embodied in a wiper device for motor vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various appliations without omitting features that, from the standpoint of prior art, fairly constitute essential characteristics of the generic or specific aspects of this invention.

What is claimed as new and desired to be protected by Letters Patent is set forth in the appended claims.

1. A wiper device for windshields of motor vehicles, comprising a wiper blade driven for an oscillating movement against a windshield to be wiped; an oscillating wiper arm connected to said wiper blade; a driven oscillating transmission member cooperating with said wiper arm; drive means for displacing said wiper arm during an oscillating movement thereof in a direction transversal to said oscillating movement, said drive means including a movable elongated plunger connected to said wiper arm and having a round cross-section, a guide for guiding said plunger in the direction of elongation thereof; slide guide means supporting said plunger and arranged near an axis of elongation of said plunger and connected with said transmission member, said slide guide means extending parallel to an axis of elongation of said plunger and including at least one guide rail rigidly connected to said transmission member and at least one sliding piece slidable on said rail and connected to said plunger, and at least one compensating hinge (58) operatively interconnected between said sliding piece and said plunger and having an axis, said compensating hinge including a first half rigidly connected to said plunger and a second half receiving said first half and rigidly connected to said sliding piece so that said sliding piece is movable about the axis of said compensating hinge which is arranged transversely to an axis of oscillation of said transmission member and transversely to a direction of movement (72) of said plunger (36).

2. The device as defined in claim 1, wherein said slide guide means includes a single guide rail parallel to the axis of elongation of said plunger and a single sliding piece which is guided on said guide rail.

3. The device as defined in claim 2, wherein said guide rail is a strip rectangular in cross-section, said sliding piece having a groove which embraces said strip at least partially at three sides thereof.

4. The device as defined in claim 3, wherein said groove has a base, said base being spaced from said strip, said first and second half of said compensating hinge being secured against displacement relative to each other in the direction of the axis of said hinge.

5. The device as defined in claim 2, wherein said guide rail is a rod round in cross-section and is connected to said transmission member via a spacer, said sliding piece being a cylindrical sleeve surrounding said rod.

6. The device as defined in claim 1, wherein said slide guide means includes two guide rails positioned opposite each other relative to the axis of elongation of said plunger and two sliding pieces each being slidable on a respective guide rail and operatively connected to said plunger; and further including a transversal hinge (48) connected to said plunger, and two compensating hinges (58) each interconnected between said transversal hinge (48) and a respective sliding piece, each compensating hinge (58) having an axis parallel to the axis of said transversal hinge (48) and spaced from said axis at a distance (74).

7. The device as defined in claim 6, wherein said two compensating hinges are in alignment with each other.

8. The device as defined in claim 7, wherein said transversal hinge includes a bearing sleeve (50) rigidly connected to said plunger and a bearing pin (52) movable in said bearing sleeve; and further including two rocker arms (54) each carrying the bearing pin (56) of a respective compensating hinge and connected to said bearing pin (52) of said transversal hinge.

9. The device as defined in claim 8, wherein each sliding piece has a bearing sleeve (60) movable on the bearing pin (56) of the respective compensating hinge.

10. The device as defined in claim 9, wherein each guide rail is a strip rectangular in cross-section, each sliding piece having a groove which embraces said strip at least partially at three sides thereof.

11. The device as defined in claim 10, wherein said groove has a base, said base being spaced from said strip, said first and second half of each compensating hinge being secured against displacement relative to each other in the direction of the axis of said hinge.

12. The device as defined in claim 8, wherein each guide rail is a rod round in cross-section and is connected to said transmission member via a spacer, each sliding piece being a cylindrical sleeve surrounding said rod.

* * * * *